United States Patent [19]
Ray

[11] Patent Number: 5,452,862
[45] Date of Patent: Sep. 26, 1995

[54] SILENT SEAT BELT COMFORT RETRACTOR

[75] Inventor: Gary M. Ray, Royal Oak, Mich.

[73] Assignee: TRW Vehicle Safety Systems Inc., Lyndhurst, Ohio

[21] Appl. No.: 241,746

[22] Filed: May 12, 1994

[51] Int. Cl.$^6$ .................................................. B60R 22/44
[52] U.S. Cl. ........................................................ 242/372
[58] Field of Search ............................ 242/372; 280/806, 280/807; 297/475, 476, 477, 478

[56] References Cited

U.S. PATENT DOCUMENTS

| | | |
|---|---|---|
| 4,162,772 | 7/1979 | Shimogawa et al. . |
| 4,213,580 | 7/1980 | Kawaharazaki et al. . |
| 4,310,128 | 1/1982 | Morita et al. . |
| 4,342,435 | 8/1982 | Yanagihara . |
| 4,585,185 | 4/1986 | Ueda ........................................ 242/372 |
| 4,711,408 | 12/1987 | Mori . |
| 4,989,804 | 2/1991 | Ebner et al. . |
| 5,165,621 | 11/1992 | Mizuno et al. ........................ 242/372 |
| 5,195,693 | 3/1993 | Sasaki et al. ........................... 242/372 |

Primary Examiner—John M. Jillions
Attorney, Agent, or Firm—Tarolli, Sundheim & Covell

[57] ABSTRACT

A seat belt retractor (10) stores belt webbing (16) which is used as a restraint for a vehicle occupant. The retractor (10) includes a rotatable webbing storage spool (14) and two springs (50, 52) for biasing rotation of the spool (14). A rotatable ratchet wheel (54) is connected between the springs (50, 52) to permit the spring force from one spring (50) to be blocked from acting on the spool (14) when the ratchet wheel (54) is prevented from rotating. A movable pawl (56) selectively engages the ratchet wheel (54) to prevent rotation of the ratchet wheel (54) in a belt retraction direction (A). The pawl (56) is both pivotable and movable transversely relative to a pawl axis (90). An actuator (60) selectively pivots the pawl (56) towards engagement with the ratchet wheel (54). A rotatable clutch (64) moves the pawl (56) transversely relative to the pawl axis (90) and away from the ratchet wheel (54), independently of the actuator (60), during rotation of the spool (14) in a belt withdrawal direction (B) to reduce noise.

20 Claims, 5 Drawing Sheets

SILENT SEAT BELT COMFORT RETRACTOR

BACKGROUND OF THE INVENTION

The present invention relates to a vehicle seat belt retractor which has a tension reducing mechanism for increasing the comfort of a vehicle occupant having a seat belt associated with the retractor extending across the occupant.

A known seat belt retractor has two springs for biasing a seat belt webbing storage spool to rotate in a belt winding direction relative to a retractor frame. The two springs are connected in series with a ratchet wheel interposed between the two springs. One end of the first spring is fixed relative to the retractor frame and the other end is attached to act on the ratchet wheel. One end of the second spring is attached to the ratchet wheel and the other end is attached to act on the spool.

The retractor has a comfort mechanism actuatable to block rotation of the ratchet wheel in the belt winding direction relative to the retractor frame. When the comfort mechanism is actuated only the spring force of the second spring is applied to bias the spool in the belt winding direction. Thus, a reduced tension is placed upon the seat belt webbing as compared to when both springs act to bias the spool in the belt winding direction. The reduced tension in the seat belt webbing increases the comfort of the vehicle occupant.

If movement of the vehicle occupant necessitates that additional seat belt webbing be withdrawn from the spool, such additional seat belt webbing is provided by rotation of the spool in a belt withdrawal direction. The ratchet wheel commonly also rotates in the belt withdrawal direction. If a ratchet blocking pawl remains engaged with the ratchet wheel, a clicking sound produced by the teeth of the ratchet wheel engaging the pawl will occur upon rotation of the ratchet wheel in the withdrawal direction.

SUMMARY OF THE INVENTION

The present invention is an improved seat belt retractor. The seat belt retractor stores seat belt webbing which is used as a restraint for a vehicle occupant. The retractor includes a spool which is rotatable about a spool axis in seat belt retraction and seat belt withdrawal directions. First and second springs are provided for biasing the spool to rotate in the seat belt retraction direction. The first spring acts between the retractor frame and a rotatable ratchet wheel. When the ratchet wheel is prevented from rotating in the belt retraction direction, the spring force of the first spring is blocked from acting on the spool.

The ratchet wheel has a plurality of teeth. A movable pawl selectively engages one tooth to prevent rotation of the ratchet wheel in the belt retraction direction. An actuator means, when actuated, moves the pawl toward the teeth of the ratchet wheel. A rotatable clutch moves the pawl away from the teeth of the ratchet wheel when the actuator means is actuated and the spool is rotating in the belt withdrawal direction.

Preferably, the actuator means is a solenoid which is actuated after an initial amount of belt webbing has been withdrawn from the spool. Also, preferably, the pawl is supported for pivotal and sliding movement relative to a pawl axis. When energized, the solenoid pivots the pawl about the pawl axis toward the teeth of the ratchet wheel. While the solenoid is energized, the clutch can move the pawl away from the teeth of the ratchet wheel.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
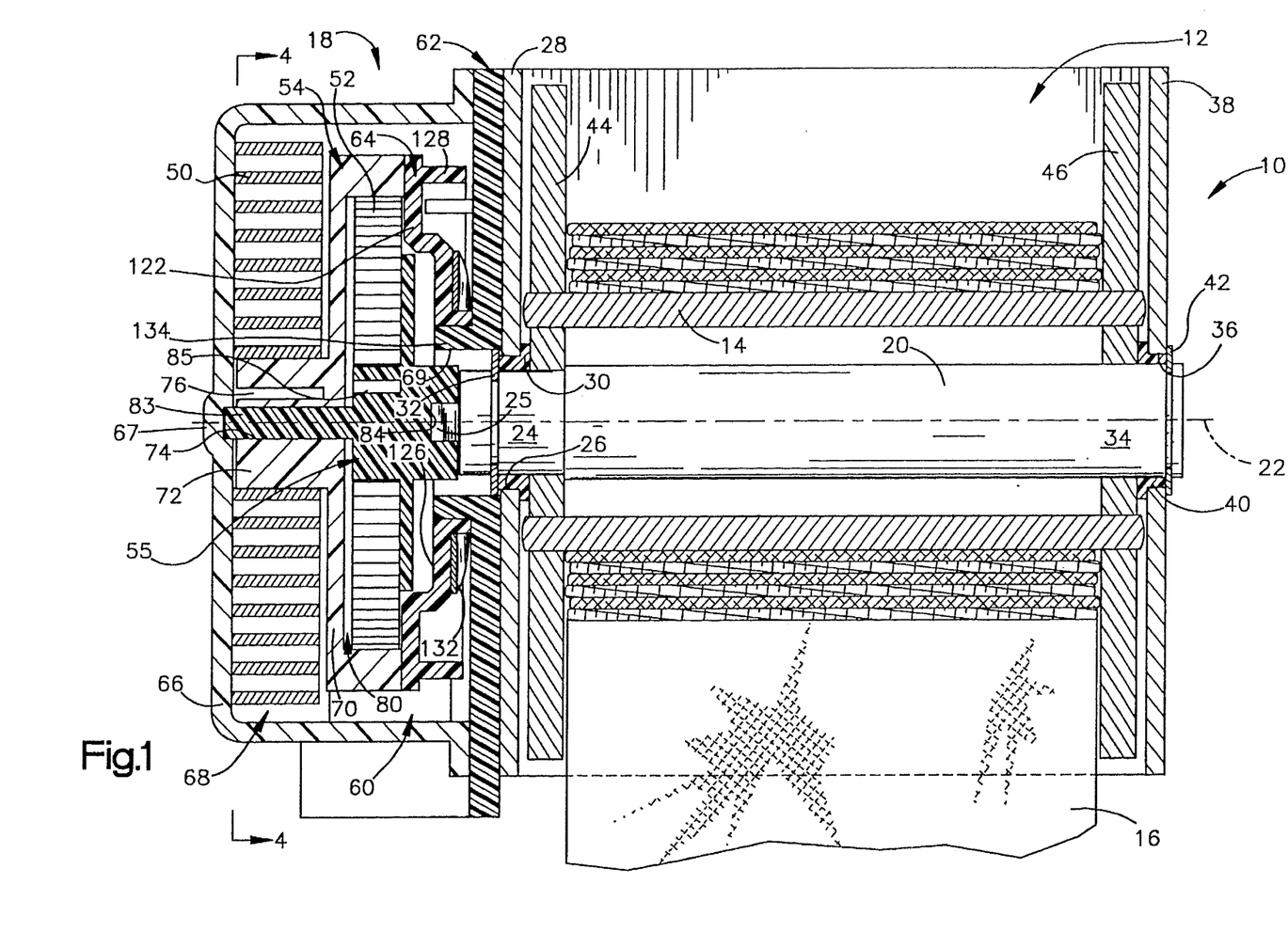
FIG. 1 is a sectional view of a seat belt retractor embodying the present invention.

A seat belt retractor 10 according to the present invention is shown in FIG. 1. The seat belt retractor includes a frame 12, a storage spool 14 supported for rotation relative to the frame 12, a length of seat belt webbing 16 wound on the spool 14, and a drive assembly 18 for biasing rotation of the spool 14. The frame 12 is metal and adapted to be mounted in a vehicle. The spool 14 is coaxial with and is fixed for rotation with a cylindrical shaft 20 about an axis 22.

A first end portion 24 of the shaft 20 extends through a circular opening 26 in one frame side 28 of the frame 12, and is supported in the opening 26 by a bearing 30. A retainer 32 engages the first end portion 24 of the shaft 20 for limiting axial movement of the shaft 20. The first end portion 24 has an axially extending drive projection 25. A second end portion 34 of the shaft 20 extends through a circular opening 36 in the other frame side 38, and is supported by a bearing 40. A retainer 42 engages the second end portion 34 for limiting axial movement of the shaft 20.

Figure 4:
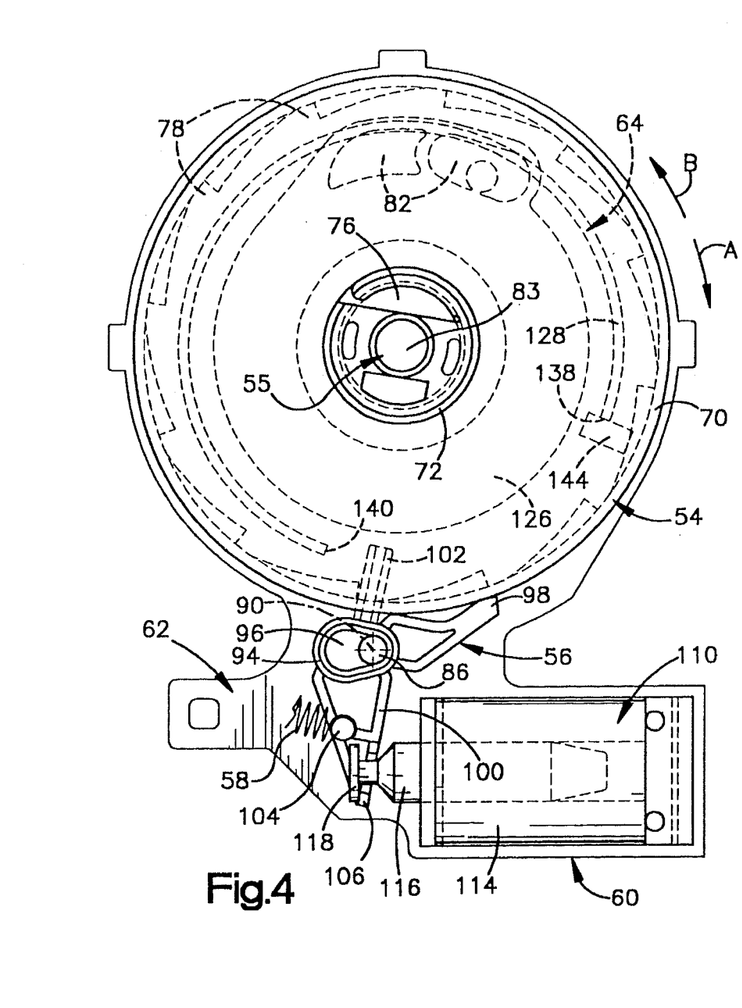
FIG. 4 is a sectional view taken along line 4—4 of FIG. 1 with certain parts removed for clarity and showing certain parts in a first operational position.

The spool 14 is rotatable in a seat belt winding (retraction) direction A (FIG. 4) and a seat belt withdrawal direction B (FIG. 4). A pair of spool locking toothed metal ratchet wheels 44 and 46 (FIG. 1) are fixed to the spool 14 and rotate with the spool 14. A metal locking pawl (not shown) is pivotally mounted for engagement with the ratchet wheels 44 and 46 to block rotation of the spool 14 in the withdrawal direction B. A mechanism (not shown), such as an inertia mass sensor assembly, causes the locking pawl to engage the ratchet wheels 44 and 46 upon the occurrence of a sudden vehicle deceleration.

Figure 2:
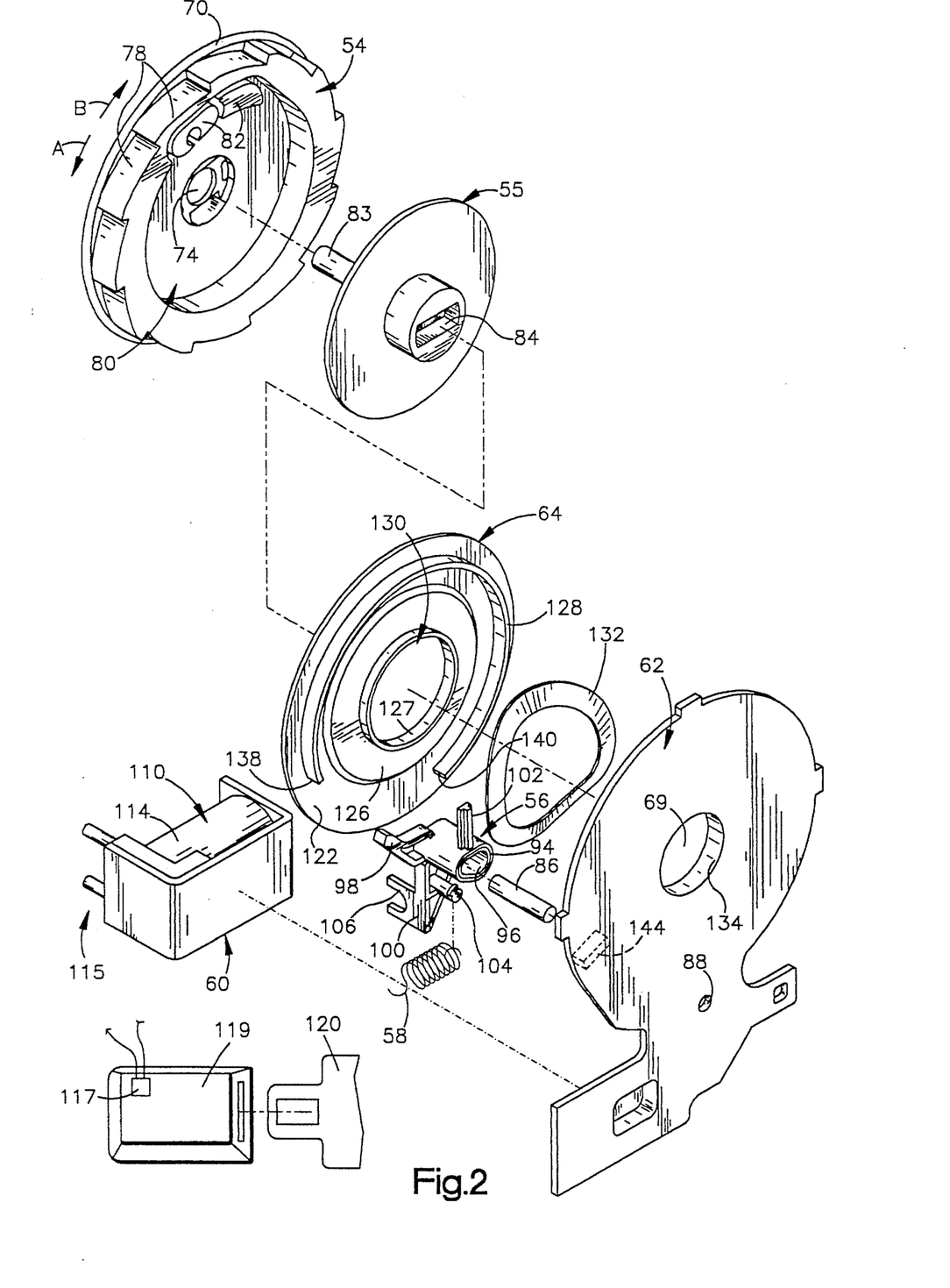
FIG. 2 is an exploded perspective view of a portion of the seat belt retractor of FIG. 1 with certain parts removed for clarity.

The drive assembly 18 provides a force biasing the shaft 20 and the spool 14 to rotate in the belt winding direction A. The drive assembly 18 includes a first spring 50, a second spring 52, a ratchet wheel 54 and a hub 55 which are located coaxially about the axis 22. The first and second springs 50 and 52 are shown in FIG. 1, but are not shown in FIGS. 2–6 for clarity. The drive assembly 18 further includes a pawl 56 (FIG. 2), a pawl spring 58, an actuator 60, a cap plate 62, a clutch 64 and a cover 66 (FIG. 1).

The cover 66 is made of plastic and has a boss 67. The first spring 50, the second spring 52, the ratchet wheel 54, the hub 55, the pawl 56, the pawl spring 58, the actuator 60 and the clutch 64 are located within a hollow interior 68 of the cover 66 and are enclosed by the cover 66 and the cap plate 62. The cover 66 and the cap plate 62 comprise a housing of the drive assembly 18 which is fixed relative to the frame 12. The cap plate 62 is made of plastic has an opening 69. The end portion 24 of the shaft 20 extends into the opening 69 of the cap plate 62.

The ratchet wheel 54 (FIG. 3) has a disk 70 and an axial hub projection 72. An aperture 74 extends along the axis 22 through the projection 72, and a spring slot 76 is located in the projection 72. A plurality of teeth 78 having sloped surfaces are located on the disk 70 and extend in an annular array about an outer periphery of the disk 70. The sloped surfaces of the teeth 78 ensure that the ratchet wheel 54 can rotate in the belt withdrawal direction B. The teeth 78 (FIG. 2) define a hollow interior 80 of the ratchet wheel 54. Spring anchor projections 82 extend from the disk 70 and are located with in the hollow interior 80.

Figure 3:
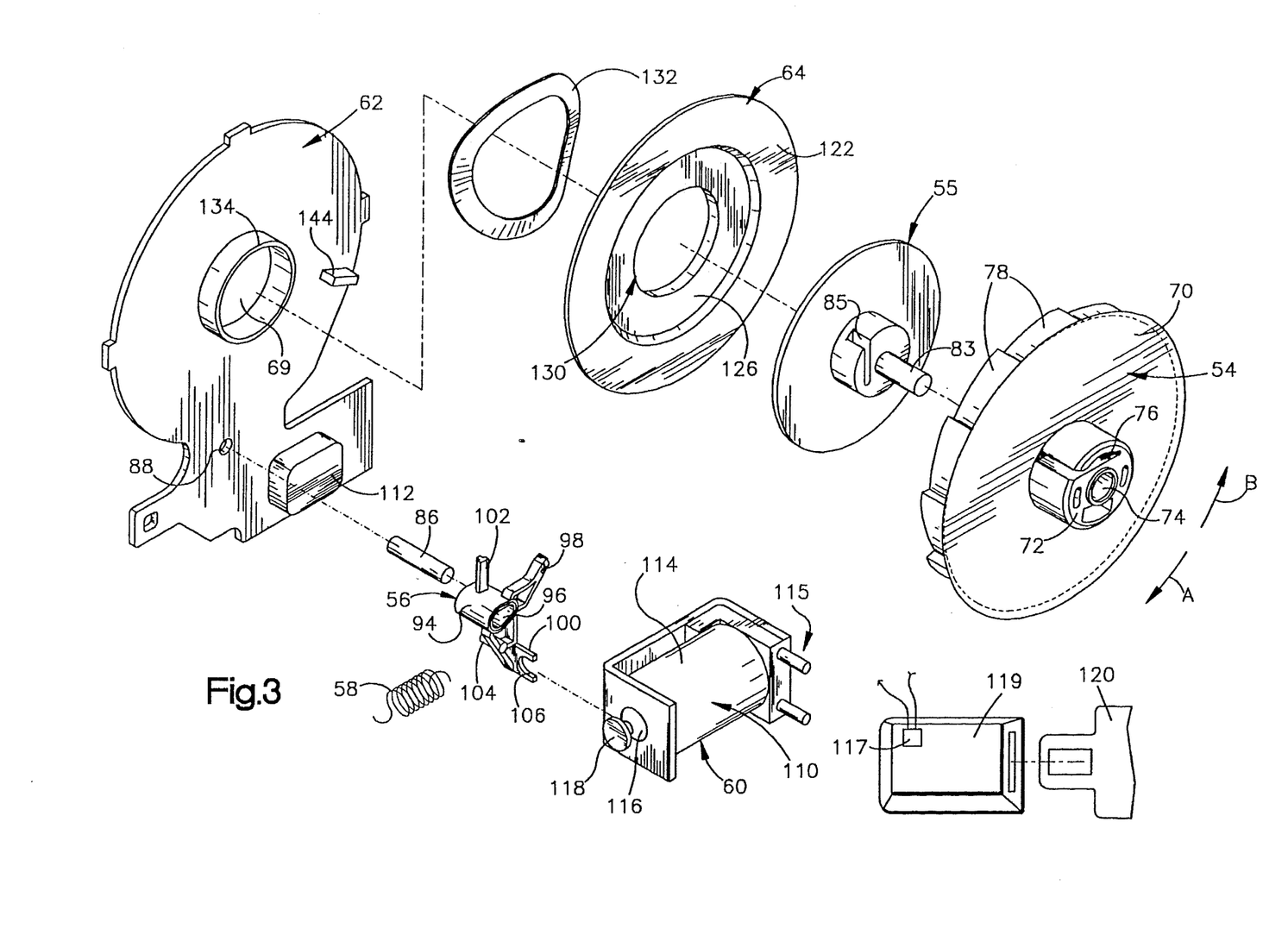
FIG. 3 is a reverse angle view of the retractor portion shown in FIG. 2.

The hub 55 has a support shaft 83, an engagement detent 84 and a spring slot 85 (FIG. 3). The support shaft 83 (FIG. 1) extends through the aperture 74 of the ratchet wheel 54 and is supported for rotation in the boss 67 of the cover 66. The ratchet wheel 54 is rotatably supported on the support shaft 83. The hub 55 extends into the opening 69 of the cap plate 62 and is mated with the shaft 20. The drive projection 25 of the shaft 20 engages the detent 84, such that the hub 55 is fixed for rotation with the shaft 20.

Each of the first and second springs 50 and 52 is a coil spring, with a plurality of coils, made of spring steel. The first spring 50 is located with its coils extending around the projection 72 of the ratchet wheel 54. A first end (not shown) of the first spring 50 is affixed to the cover 66 by a fastener (not shown). The second end (not shown) of the first spring 56 is fitted into the spring slot 76 of the ratchet wheel 54. Thus, the second end of the first spring 50 is fixed for rotation with the ratchet wheel 54. The first spring 50 acts between the cover 66 and the ratchet wheel 54.

The second spring 52 is located in the hollow interior 80, concentrically within the annular array of teeth 78 of the ratchet wheel 54. A first end (not shown) of the second spring 52 is connected with the spring projections 82 (FIG. 2) of the ratchet wheel 54. Thus, the first end of the second spring 52 is fixed for rotation with the ratchet wheel 54. The second end (not shown) of the second spring 52 is fitted into the spring slot 85 of the hub 55. Thus, the second end of the second spring 52 is fixed for rotation with the hub 55. The second spring 52 acts between the ratchet wheel 54 and the hub 55.

The first spring 50 is stronger than the second spring 52 and provides a greater spring force. Also, the first and second springs 50 and 52 are connected in series, through the ratchet wheel 54, to bias the hub 55 and the shaft 20 to rotate in the belt winding direction A relative to the frame 12. When webbing is withdrawn from the spool 14, the hub 55 is rotated in the belt withdrawal direction B. Rotation of the hub 55 in the belt withdrawal direction B causes the coils of the second spring 52 to tighten against the hub 55.

As the coils of the second spring 52 tighten, the ratchet wheel 54 is biased to rotate about the axis 40 in the belt withdrawal direction B. When the ratchet wheel 54 is rotated in the belt withdrawal direction B, the coils of the first spring 50 tighten against the projection 72. Thus, as the belt webbing 16 is withdrawn from the spool 14, the first and second springs 50 and 52 provide an increasing combined spring force biasing the shaft 20 and the spool 14 to rotate in the belt winding direction A.

The pawl 56 (FIG. 3) is made of molded plastic and is mounted on a pawl mounting post 86. The pawl mounting post 86 extends from a post hole 88 in the cap plate 62 and extends along a pawl axis 90 (FIG. 4). The pawl 56 includes a body 94, a tooth engagement arm 98, a solenoid engagement arm 100 and a clutch engagement arm 102. The body 94 has an elongated slot 96 defined by a surface of the body 94. The slot 96 is elongated in a direction generally perpendicular to the direction of the pawl axis 90. The pawl mounting post 86 extends through the slot 96 and supports the pawl 56 for pivotal movement about the pawl axis 90 and for transverse sliding movement along the slot 96 relative to the pawl mounting post 86.

The tooth engagement arm 98 extends from the body 94 in a direction perpendicular to the pawl axis 90, generally upward, as viewed in the drawings, at an angle. The tooth engagement arm 98 is positioned for selective engagement with one of the teeth 78 on the ratchet wheel 54. The clutch engagement arm 102 extends from the body 94 in a direction perpendicular to the pawl axis 90 in a substantially upward direction as viewed in the drawings. The solenoid engagement arm 100 extends from the body 94 in a direction perpendicular to the pawl axis 90 in a generally downward direction as viewed in the drawings.

The solenoid engagement arm 100 includes a spring mount 104 and a pin engagement socket 106 (FIG. 3). The pawl spring 58, which is a tension spring, is connected at one end to the spring mount 104. The other end of the pawl spring 58 is attached to the cover 66. The pawl spring 58 biases the pawl 56 to a first position (FIG. 4) such that the pawl mounting post 86 is located at a first end of the slot 96 and the tooth engagement arm 98 is pivoted (clockwise, as shown in FIG. 4) away from the teeth 78 of the ratchet wheel 54 about the axis 90.

The actuator 60 includes an electrical solenoid 110 which is held in place by a portion 112 (FIG. 3) of the cap plate 62 and a portion of the cover 66. The solenoid 110 includes an electrical coil 114 and a movable metallic pin 116. The solenoid 110 has electrical leads 115 connected to a source of electrical energy and a controlling switch, such as a buckle sensor 117 on a seat belt buckle 119 (schematically illustrated), for activation of the solenoid 110. The buckle sensor 117 senses the coupling of a tongue 120 into the buckle 119. During activation of the solenoid 110, the pin 116 is drawn into the coil 114 of the solenoid. When the solenoid 110 is deactivated, the pin 116 is free to move partially out of the coil 114.

Figure 5:
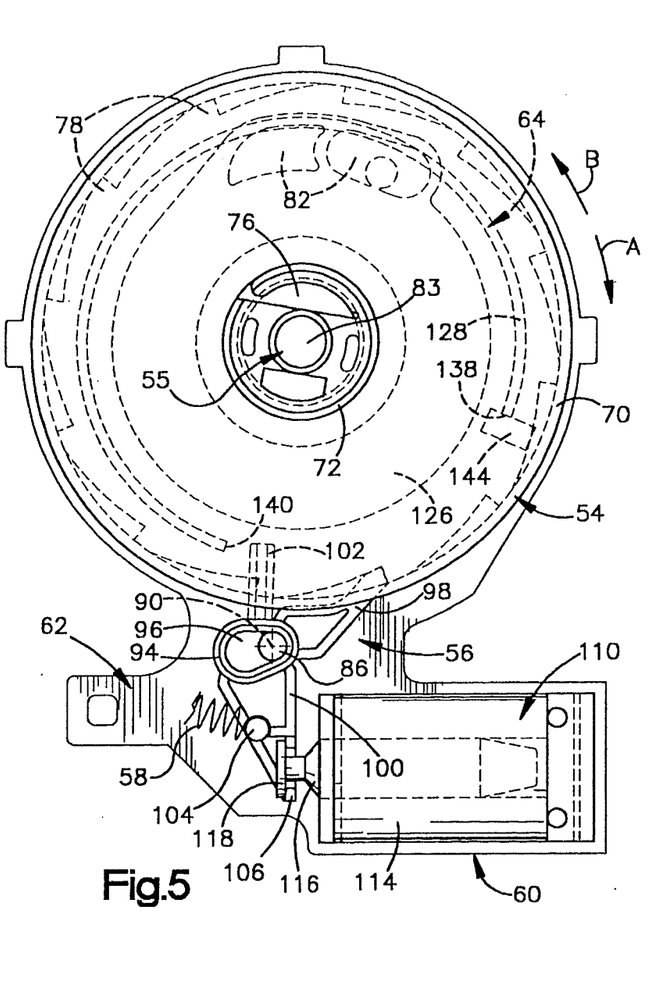
FIG. 5 is a view similar to FIG. 4 showing certain parts in a second operational position.

The pin 116 has a pin head 118 (FIG. 4). The pin head 118 interfits with the pin engagement socket 106 on the solenoid engagement arm 100 of the pawl 56. Movement of the pin 116 upon activation of the solenoid 110 causes the pawl 56 to pivot (counterclockwise, as shown in FIG. 5) about the pawl axis 90 into engagement with a tooth 76 on the ratchet wheel 54.

The actuator 60, when actuated to move the pawl 56 into engagement with a tooth 78 on the ratchet wheel 54, causes the pawl 56 to block rotation of the ratchet wheel 54 in the belt winding direction A. This prevents the first spring 50 from applying its spring force to bias the spool 14 (FIG. 1) to rotate in the belt winding direction A. Thus, the actuator 60, the pawl 56 and the ratchet wheel 54 provide a comfort setting in which only the second spring 52, which provides a lesser force than the combined spring force of the first and second springs 50 and 52, acts to bias the spool 14 in the belt winding direction A. When the retractor 10 is in the comfort setting, a reduced tension force is transmitted by the belt webbing 16 to the vehicle occupant because only the second spring 52, which is a relatively weak spring, acts upon the shaft 20.

During initial withdrawal of belt webbing 16 from the spool 14 against the force of both springs 50 and 52, the solenoid 110 is not active and, thus, the pin 116 is located partially out of the coil 114. The pawl spring 58 biases the pawl 56 to its first position (FIG. 4) such that the tooth engagement arm 98 is not in engagement with any of the teeth 78 on the ratchet wheel 54.

Once the vehicle occupant withdraws a sufficient length of belt webbing 16, the occupant can secure the belt webbing 16 in position extending across the occupant by coupling the buckle 119 (FIG. 3) and the tongue 120. As the belt webbing 16 is secured across the vehicle occupant, the solenoid 110 is electrically activated (FIG. 5) by activation of the buckle sensor 117 (FIG. 3). The activation of the solenoid 110 causes the coil 114 to draw the pin 116 into the coil 114. The pin 116 pulls on the solenoid engagement arm 100 and pivots the pawl 56 about the pawl axis 90 (counterclockwise, as shown in FIG. 5). The tooth engagement arm 98 is pivoted into engagement with one of the teeth 78 on the ratchet wheel 54. Thus, the ratchet wheel 54 is prevented from rotating in the belt winding direction A. The ratchet wheel 54 is held stationary relative to the cap plate 62, and the first spring 50 cannot apply a spring force to bias the spool 14.

Often, when a vehicle occupant withdraws a length of belt webbing 16 to extend across the vehicle occupant, a slight excess of belt webbing 16 is withdrawn. This slight excess of belt webbing 16 is wound back onto the spool 14 after buckling due to the bias of the second spring 52. When the excess amount of belt webbing 16 is wound back onto the spool 14, the stress in the second spring 52 is reduced. Thus, the rewind tension force perceived by the vehicle occupant in the belt webbing 16 is further reduced.

If movement of the vehicle occupant, such as reaching to unlock an opposite door, necessitates that additional belt webbing 16 be withdrawn from the spool 14, such additional belt webbing 16 is provided by rotation of the shaft 20 in the belt withdrawal direction B. If the second spring 52 is sufficiently tightened, the ratchet wheel 54 tends to rotate in the withdrawal direction B (counterclockwise, as shown in FIG. 5). If the actuator 60 is unactuated, the pawl spring 58 biases the pawl 56 to the position shown in FIG. 4, and the ratchet wheel 54 can rotate in the belt withdrawal direction B without the unwanted noise associated with the tooth engagement arm 98 dropping into the bottom of each tooth 78. If the actuator 60 is actuated (FIGS. 5 and 6), then the clutch 64 and the clutch engagement arm 102 of the pawl 56 ensure that such an additional amount of belt webbing 16 is provided without the unwanted noise by transversely sliding the pawl 56 to move the tooth engagement arm 98 away from the ratchet wheel 56.

The clutch 64 (FIG. 2) is an annular member with a central aperture 130 and is located between the ratchet wheel 54 and the cap plate 62. A central projection 134 (FIG. 1) of the cap plate 62 encircles the opening 69 and extends into the aperture 130 so that the clutch 64 is mounted for rotation on the central projection 134. The clutch 64 (FIG. 2) includes a disk portion 122, an annular projection 126 with a boss 127, and an arc-shaped projection 128. The annular projection 126 extends from the disk portion 122 toward the cap plate 62.

The arc-shaped projection 128 (FIG. 2) is located radially outward from the annular projection 126 and extends from the disk portion 122 toward the cap plate 62. The arc-shaped projection 128 partially encircles the axis 22 at a fixed radial distance. The arc-shaped projection 128 extends approximately three-quarters around the axis 40 and has a first end 138 and a second end 140.

A steel wave spring washer 132 is mounted on the boss 127 of the clutch 64, between the cap plate 62 and the annular projection 126 of the clutch 64. The spring washer 132 engages the cap plate 62 and the annular projection 126 of the clutch 64 and biases the clutch 64 into frictional engagement with the ratchet wheel 54. Thus, the clutch 64 is rotatable with the ratchet wheel 54 so long as the static frictional engagement between the clutch 64 and the ratchet wheel 54 is not overcome. When the static frictional engagement is overcome, the ratchet wheel 54 and the clutch 64 can rotate relative to each other.

In a first rotational position (FIG. 4) of the clutch 64, the first end 138 of the arc-shaped projection 128 rests against a clutch stop 144. The clutch stop 144 extends from the cap plate 62 parallel to the axis 40. The clutch 64 is rotated to the first position upon rotation of the ratchet wheel 54 in the belt winding direction A through a partial revolution. Thereafter, the clutch 46 remains in the first position, held by the clutch stop 144, throughout continued rotation of the ratchet wheel 54 in the belt winding direction A. During such rotation of the ratchet wheel 54, the ratchet wheel 54 slides on the adjacent surface of the clutch 64.

In a second rotational position (FIG. 6) of the clutch 64, the second end 140 of the arc-shaped projection 128 engages the clutch engagement arm 102 of the pawl 56. The clutch 64 is rotated to the second position upon rotation of the ratchet wheel 54 in the belt withdrawal direction B through a partial revolution. Once in the second position, the clutch 64 remains in the second position, against the clutch engagement arm 102, throughout continued rotation of the ratchet wheel 54 in the belt withdrawal direction B. During such rotation of the ratchet wheel 54, the ratchet wheel 54 slides on the adjacent surface of the clutch 64.

Figure 6:
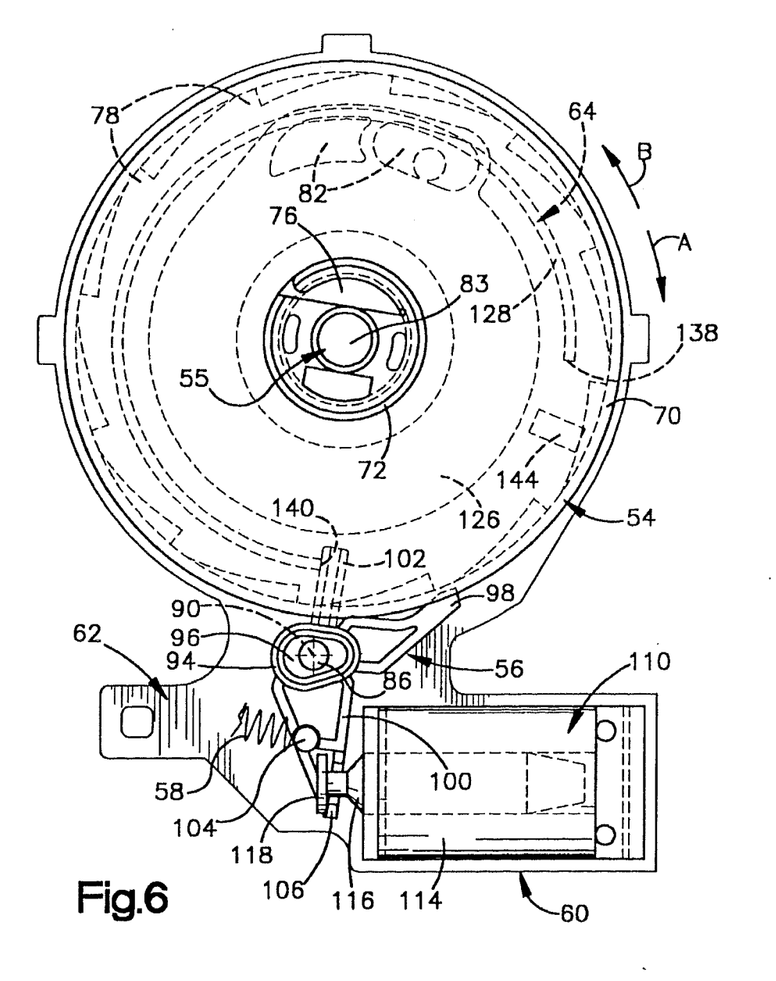
FIG. 6 is a view similar to FIG. 4 showing parts in a third operational position.

Movement of the clutch 64 to the second position (as shown in FIG. 6) is significant when the solenoid 110 is actuated to pivot the tooth engagement arm 98 of the pawl 56 toward the teeth of the ratchet wheel 54. When the clutch 64 moves to the second position, the rotational force applied by the ratchet wheel 54 to the clutch 64 and thus the arc-shaped projection 128 forces the pawl 56 to slide transversely relative to the pawl mounting post 86 against the bias of the pawl spring 58. As the pawl 56 slides (toward the right in FIG. 6), a second end of the slot 96 is moved toward the pawl mounting post 86. This sliding movement of the pawl 56 moves the tooth engagement arm 98 away from the teeth 78 of the ratchet wheel 54. The tooth engagement arm 98 remains away from the teeth 78 while the clutch 64 is in the second position. A clicking sound is not created when the ratchet wheel rotates in the belt withdrawal direction B and when the solenoid 110 is activated because the tooth engagement arm 98 does not drop into the bottom of each tooth 78.

In operation, after the vehicle occupant has withdrawn a length of belt webbing 16 and has secured it in a position extending across the vehicle occupant, the solenoid 110 is electrically activated and the tooth engagement arm 98 is in engagement with one of the teeth 78 on the ratchet wheel 54 (FIG. 5). Thus, the ratchet wheel 54 is prevented from rotating in the belt winding direction A and the first spring 50 does not bias the spool 14. The first end 138 of the arc-shaped projection 128 is in, or near, engagement with the clutch stop 144 on the cap plate 62 (FIG. 5). The clutch 64 has previously been rotated to such a position due to the frictional engagement between the clutch 64 and the ratchet wheel 54.

When a sufficient amount of additional belt webbing 16 is subsequently withdrawn from the spool 14, the second spring 52 is further stressed to bias the ratchet wheel 54 to rotate in the belt withdrawal direction B. As the ratchet wheel 54 is rotated, the frictional engagement between the clutch 64 and the ratchet wheel 54 causes the clutch 64 to also rotate in the belt withdrawal direction B. The rotation of the clutch 64 in the belt withdrawal direction B causes the clutch 64 to move toward its second position (FIG. 6).

During this movement, the second end 140 of the arc-shaped projection 128 engages the clutch engagement arm 102 and pushes the clutch engagement arm 102 (toward the right as shown in FIGS. 5 and 6). This causes the pawl 56 to slide relative to the pawl mounting post 86. The tooth engagement arm 98 is moved away from the teeth 78 and is prevented from dropping into each respective tooth 78 as the ratchet wheel 54 is rotated in the withdrawal direction B. Thus, a clicking noise as each of the teeth 78 moves past the tooth engagement arm 98 is prevented.

When this withdrawal of additional belt webbing 16 ceases, a slight retraction of the belt webbing 16 generally occurs. During this slight retraction of belt webbing 16, the ratchet wheel 54 is slightly rotated in the belt winding direction A. Due to the frictional engagement between the clutch 64 and the ratchet wheel 54, the clutch 64 is also rotated in the belt winding direction A. Thus, the clutch 64 is moved from its second position, wherein the second end 140 is in engagement with the clutch engagement arm 102, toward its first position, wherein the first end 138 would engage the clutch stop 144.

During this rotation of the clutch 64, the pawl 56 slides (towards the left, FIG. 5) relative to the pawl mounting post 86 under the bias of the pawl spring 58. The tooth engagement arm 98 is moved toward the teeth 78 on the ratchet wheel 54 and will engage the next one of the teeth 78 which is rotated toward the tooth engagement arm 98.

When the tooth engagement arm 98 engages one of the teeth 78, the first spring 50 is again prevented from applying its spring force to bias rotation of the spool 14. A new comfort setting is established wherein only the second spring 52 biases the spool 14.

From the above description of the invention, those skilled in the art will perceive improvements, changes and modifications. Such improvements, changes and modifications within the skill of the art are intended to be covered by the appended claims.

Having described the invention, the following is claimed:

1. A retractor for storing seat belt webbing for restraining a vehicle occupant, said retractor comprising:

a webbing storage spool rotatable about a spool axis in belt retraction and belt withdrawal directions;

first and second springs acting in series for biasing said spool for rotation in the belt retraction direction;

a rotatable ratchet wheel between said springs and rotatable relative to said spool, said ratchet wheel having a plurality of teeth;

a movable pawl for selectively engaging a tooth of said ratchet wheel to prevent rotation of said ratchet wheel in the belt retraction direction;

actuator means for moving said pawl into position for engagement with said tooth of said ratchet wheel when activated; and means for moving said pawl away from said ratchet tooth and for holding said pawl away from said ratchet teeth while said actuator means is actuated and said spool is rotating in the belt withdrawal direction.

2. A retractor as defined in claim 1 wherein said means for moving said pawl and holding said pawl includes means for holding said pawl away from said ratchet teeth during withdrawal of belt webbing beyond an initial amount of belt webbing.

3. A retractor as set forth in claim 2, including support means for supporting said pawl for pivotal movement and transverse movement relative to a pawl axis, said actuator means including means for pivoting said pawl relative to said axis, said means for moving said pawl and for holding said pawl including a means for moving said pawl in a direction transverse to said pawl axis.

4. A retractor as set forth in claim 3, wherein said means for moving said pawl in a direction transverse to said pawl axis includes a rotatable clutch which moves said pawl independently of said actuator means during rotation of said spool in the belt withdrawal direction.

5. A retractor as set forth in claim 4, wherein said pawl includes surface means defining a slot, said support means extending through said slot.

6. A retractor as set forth in claim 5, including means for biasing said pawl relative to said support means to position said support means at a first end of said slot, wherein said rotatable clutch includes means for engaging a portion of said pawl and for moving said pawl in a direction transverse to said pawl axis and relative to said support means to position said support means at a second end of said slot.

7. A retractor as set forth in claim 4, wherein said rotatable clutch includes a projection which extends in an arc about the spool axis at a distance from the spool axis, said projection being engageable with a portion of said pawl, said retractor further comprising a stop located adjacent to said clutch, said clutch having a first position after rotation of said spool in the belt retraction direction in which said projection engages said stop, said clutch having a second position after rotation of said spool in the belt withdrawal direction in which said projection engages said portion of said pawl.

8. A retractor as set forth in claim 4, wherein said clutch is rotatable both with said ratchet wheel and relative to said ratchet wheel.

9. A retractor as set forth in claim 1, wherein said pawl includes an actuator engagement arm engaged with said actuator means.

10. A retractor as set forth in claim 9, wherein said actuator means includes an electrical solenoid which is actuated after an initial amount of belt webbing has been withdrawn from said spool, said solenoid includes a movable member engaged with said actuator engagement arm.

11. A retractor for storing seat belt webbing for restraining a vehicle occupant, said retractor comprising:

a webbing storage spool rotatable about a spool axis in belt retraction and belt withdrawal directions;

first and second springs for biasing said spool for rotation in the belt retraction direction;

a rotatable ratchet wheel connected with said first spring for blocking the spring force of said first spring from acting on said spool when said ratchet wheel is prevented from rotating, said ratchet wheel having a plurality of teeth;

a movable pawl for selectively engaging one of said teeth to prevent rotation of said ratchet wheel in the belt retraction direction;

support means for supporting said pawl for pivotal movement and transverse movement relative to a pawl axis;

actuator means for selectively pivoting said pawl about said pawl axis toward said teeth; and a rotatable clutch for moving said pawl in a direction transverse to said pawl axis and away from said teeth independently of said actuator means during rotation of said spool in the belt withdrawal direction.

12. A retractor as set forth in claim 11, wherein said pawl includes surface means defining a slot, said support means extending through said slot.

13. A retractor as set forth in claim 12, further including means for biasing said pawl relative to said support means to position said support means at a first end of said slot.

14. A retractor as set forth in claim 13, wherein said rotatable clutch includes means for engaging a portion of said pawl and for moving said pawl relative to said support means to position said support means at a second end of said slot.

15. A retractor as set forth in claim 11, wherein said rotatable clutch includes a projection which extends in an arc about the spool axis at a distance from the spool axis, said projection being engageable with a portion of said pawl.

16. A retractor as set forth in claim 15, wherein said projection extends substantially about the spool axis, said retractor further including a stop located adjacent to said clutch, said clutch having a first position after rotation of said spool in the retraction direction in which said projection engages said stop, said clutch having a second position after rotation of said spool in the withdrawal direction in which said projection engages said portion of said pawl.

17. A retractor as set forth in claim 11, including spring means for biasing said clutch into frictional engagement with said ratchet wheel.

18. A retractor as set forth in claim 11, wherein said pawl includes an actuator engagement arm engaged with said actuator means.

19. A retractor as set forth in claim 18, wherein said actuator means includes an electrical solenoid, said solenoid including a movable member engaged with said actuator engagement arm.

20. A retractor as set forth in claim 11, further including:

a housing portion with a cap plate having an aperture, a shaft rotatable with said spool and having a portion extending into said aperture of said cap plate;

said cap plate having a clutch stop projection extending parallel to the spool axis, said clutch being located adjacent to said cap plate;

said clutch having an arc-shaped projection extending about the spool axis and facing said cap plate;

spring means engaging said cap plate and said clutch for biasing said clutch into frictional engagement with said ratchet wheel;

said pawl having a tooth engagement arm, an actuator engagement arm, a clutch engagement arm and a slot, said tooth engagement arm being engageable with said ratchet wheel upon pivotal movement of said pawl about said pawl axis, said actuator engagement arm being engaged with said actuator means for pivoting said pawl about said pawl axis, said clutch engagement arm being engageable by said arc-shaped projection for transverse movement of said pawl, said support means extends through said slot for permitting sliding movement of said pawl;

said first spring having a plurality of coils with a first end fixed relative to said housing portion and a second end fixed relative to said ratchet wheel, said second spring having a plurality of coils with a first end fixed relative to said ratchet wheel and a second end fixed relative to said shaft, said first and second springs biasing said shaft in the belt retraction direction;

rotation of said ratchet wheel in the belt retraction direction rotates said clutch in the belt retraction direction until said arc-shaped projection engages said clutch stop, rotation of said ratchet wheel in the belt withdrawal direction rotates said clutch in the belt withdrawal direction until said arc-shaped projection engages said clutch engagement arm and slides said pawl.

\* \* \* \* \*